May 15, 1951 R. C. DEHMEL 2,553,529
CONTROL CIRCUIT FOR RECORDING MECHANISMS
Original Filed March 27, 1945
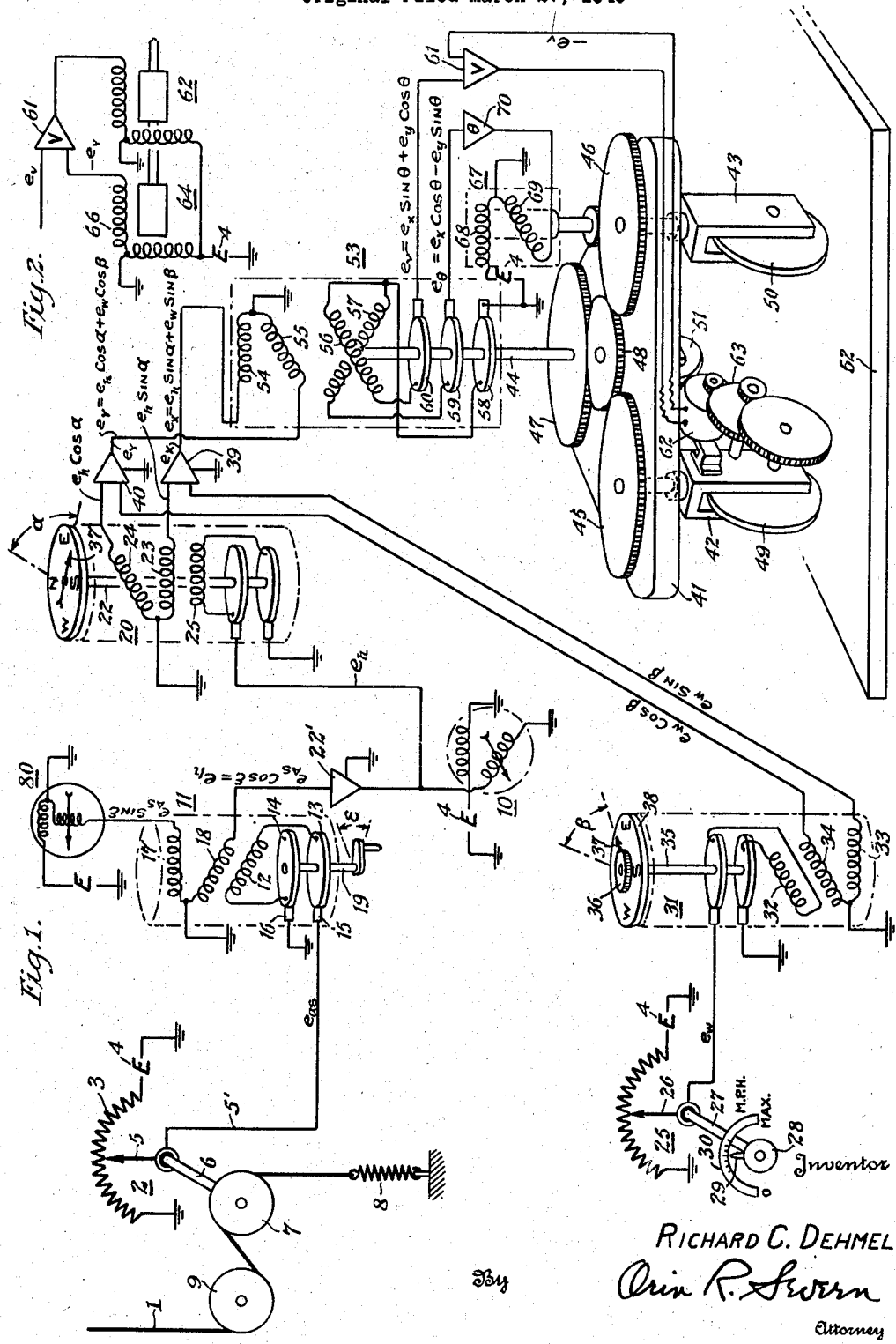
Inventor
RICHARD C. DEHMEL
Attorney Patented May 15, 1951

2,553,529

UNITED STATES PATENT OFFICE 2,553,529

CONTROL CIRCUIT FOR RECORDING MECHANISMS

Richard Carl Dehmel, Short Hills, N. J.

Continuation of application Serial No. 585,101, March 27, 1945. This application May 1, 1947, Serial No. 745,225

6 Claims. (Cl. 35—10.2)

This invention relates to recording mechanism of the type in which a movable recording member is actuated in accordance with the variation of certain controlling factors.

This application is a continuation of my forfeited application S. N. 585,101, filed March 27, 1945 for "Control Circuit for Recording Mechanisms."

An object of this invention is to provide an improved recording mechanism constructed and arranged to automatically coordinate the results of a plurality of independently variable parameters and to chart an accurate record of the varying sum of such independent variables.

The invention is especially adapted for use in connection with the course charting mechanism of a well known type of ground trainer for aircraft pilots in which a steerable recording member is now actuated in accordance with airspeed and direction of flight as the controlling parameters, and a further object is to introduce into the recorder control mechanism of such a device additional parameters, such, for example, as wind drift, so that the recorder in charting the simulated flight of the trainer will automatically coordinate the results of a plurality of independent variables, such, for example, as both wind drift and airspeed vectors, thereby correctly recording the ground path of any simulated flight. It will, however, be apparent from the following description that vectors representing other variables can be employed.

A further object is to provide a recording mechanism for use in ground trainers constructed and arranged to operate a steerable recording member continuously at speeds which are always proportional to the simulated ground speed of the trainer.

A still further object is to provide in a mechanism of this type a control circuit for the recorder actuating motor arranged to insure a remarkably accurate correspondence between the velocity of the recording member and the motor control voltage which varies with the simulated ground speed of the trainer.

These and other objects which will be apparent are accomplished by this invention, an illustrative embodiment of which is shown in the accompanying drawing in which Fig. 1 is a diagrammatic view showing voltage deriving and control circuits illustrating one embodiment of the invention, and showing the same arranged to operate and control the movable recorder member of a well known type of trainer mechanism, although it should be understood that the present invention is adaptable to the control and operation of many other types and forms of recorder, and Fig. 2 is a similar view of a detail.

As illustrated, a member responsive to one of the variables to be recorded is shown in the form of a cable 1, movement of which is responsive to changes in the value of a controlling parameter. It may be, for example, the airspeed cable of a well known mechanically or penumatically operated trainer, the movement of which is responsive to and proportional to changes in value of a controlling parameter. It may, for example, be moved by the trainer mechanism in accordance with simulated airspeed. As illustrated, this cable is used to operate voltage varying means such as a voltage dividing potentiometer 2, having a winding 3 energized by a reference source 4 of alternating current. An insulated contact 5 engaging the winding 3 and mounted for rotation on shaft 6 transmits a voltage $e_{as}$ which is proportional to airspeed, from the winding 3 through a conductor 5'. Shaft 6 is rotated by a pulley 7 according to the movement of cable 1 which is held against the pulley by any suitable means, such as a tension spring 8. An idler pulley 9 may be provided to assure contact of cable 1 with the pulley 7.

As will be apparent to those skilled in the art, the potentiometer 2 is only one means for deriving the airspeed voltage $e_{as}$, and numerous other devices may be employed equally well.

One advantage of the present invention is the elimination of the expensive pneumatic airspeed meter heretofore required in mechanical trainers and the substitution of a simple A. C. voltmeter 10 calibrated in airspeed and actuated by resolved voltages.

Another advantage of the circuit shown in the drawing is that the airspeed voltage $e_{as}$ may, if desired, be resolved into two components, one representing the vertical component or rate of climb of the trainer and the other representing the horizontal airspeed. This resolution is accomplished by a rotary transformer 11 having an adjustable single phase winding 12 energized by the airspeed voltage $e_{as}$ through slip rings 13 and 14 and brushes 15 and 16. The winding 12 is magnetically coupled with the two-phase windings 17 and 18 with the result that such windings have respectively induced therein the voltages $e_{as}$ sine $\epsilon$ and $e_{as}$ cosine $\epsilon$ where $\epsilon$ is the electrical angle between the single and two-phase windings and represents the angle of climb of the trainer. These voltages have potential and phase as parameters which vary with the angle $\varepsilon$. This angle is varied by a shaft 19 arranged to rotate the winding 12 and connected in any suitable manner, not shown, for movement in accordance with the angle of climb of the trainer. For example, it may be operatively connected for movement in accordance with the pitch of the fuselage, or with the pitch element of the artificial horizon of the associated trainer, or any similar device.

It is to be noted that the voltage $e_{as}$ cosine $\varepsilon$ is proportional to the horizontal component of airspeed and may be designated $e_h$.

For reasons hereinafter pointed out, the voltage $e_h$ is, in the illustrated embodiment, resolved into components along a pair of quadrature reference axes which may be, for example, the N—S and E—W compass axes. For this purpose a rotary transformer 20 similar to the transformer 11 above described having a single-phase winding 21 is energized by the voltage $e_h$ and is mounted on a rotatable shaft 22 adjustable with respect to the two-phase windings 23 and 24 in accordance with the heading angle $\alpha$ of the trainer. For such rotation the shaft 22 may be operatively connected to the spindle of the trainer fuselage or to an element of the magnetic or gyroscopic compass moving with the azimuth of the associated trainer. A linear amplifier 22' having a high input impedance and low output impedance, as is well known in the art, minimizes load variations on the preceding units of the circuit.

By this means a voltage $e_h$ sine $\alpha$ induced in winding 23 is proportional to the velocity of the trainer in the reference direction herein for convenience designated $x$, and a voltage $e_h$ cosine $\alpha$ induced in winding 24 is proportional to the velocity of the trainer in the reference direction herein designated $y$. Each of these voltages has potential and phase as parameters that vary according to the direction and velocity of the airplane with relation to the reference axes.

The resolution of the voltage $e_h$ into voltages along quadrature axes provides a common reference system for all vectors. This is particularly desirable where the vectors vary independently from one another in their instant directions. An instance of such independent variation is wind drift. In this instance the wind may vary in an entirely different manner from the velocity and heading of the airplane.

To derive the voltages representing the components of velocity of wind along the selected quadrature reference axes, two potentiometers may be set in accordance with said velocity components and furnish the desired voltages. However, wind information is usually provided in terms of velocity and direction. Hence, it is convenient to employ means such as a potentiometer 25, energized by the alternating current source 4 to derive a voltage $e_w$ which is proportional to wind velocity. For this purpose an insulated contact 26 mounted on shaft 27 may be positioned by a knob 28 so that the index 29 is at the proper wind velocity value as indicated by its registration with wind scale 30.

The wind velocity voltage $e_w$ is resolved into components along the above referred to axes $x$ and $y$, by a rotary transformer 31 which is similar to transformer 11 previously described in detail. The single-phase winding 32 of the transformer 31 is energized by the voltage $e_w$ and is angularly adjustable with respect to the two-phase windings 33 and 34 by being connected to a rotatably mounted shaft 35 to which is attached a hand wheel 36 and index 37. The hand wheel is set to the desired wind direction $\beta$, where $\beta$ is the electrical angle between the single and two-phase windings and represents the angle between the compass North and the wind direction, as indicated on the compass card 38. A voltage $e_w$ sine $\beta$ is induced in winding 33 and is proportional to the velocity of the wind in the reference direction above designated as $x$. Similarly, a voltage $e_w$ cosine $\beta$ is induced in winding 34 and is proportional to the velocity component of the wind in the direction above designated as $y$. Each induced voltage has potential and phase as parameters which vary with the velocity and direction of the wind as a result of the varying setting of the potentiometer 25.

The ground path of flight of the trainer is the resultant of the trainer airspeed and wind velocity vectors. In this invention these vectors are combined by the electrical summation of their representative control quantity, such as voltage, components. As illustrated, this is accomplished by means of the summing amplifiers 39 and 40 to give the voltages $e_x$ and $e_y$ respectively. Since amplifiers of this type are well known in the art, a detailed description thereof is not necessary, other than to mention that the voltages to be summed may be led individually to suitable resistances that terminate in a common connection associated with the control grid of the input tube.

The drawing illustrates a conventional type of steerable course recorder adapted to the present invention. As shown in Fig. 1, a plate 41 constitutes the body of the recorder and supports three rotatable vertical spindles, two of which are shown by reference characters 42 and 43, and third not being shown but extending below and moving with shaft 44. These spindles are rotated respectively by gears 45, 46 and 47 held in synchronism by idler gear 48. The spindles respectively support journaled wheels 49, 50 and 51 which roll on the chart surface 52. If any one of the wheels such as 49 be propelled at the resultant velocity and direction of the combined airspeed and wind vectors, the recorder will trace the ground course of the trainer. A permanent record of the course may be obtained by inking one of the wheels.

Means are provided for operating the recorder to chart the ground path of simulated flight as determined by the velocity and direction of both the trainer and wind, as determined by the voltage components $e_x$ and $e_y$. Obviously, each of the variable factors may change in degree and direction frequently during a simulated flight. As illustrated, a rotary transformer 53 is used to compose the voltages $e_x$ and $e_y$ into control voltages $e_v$ and $e_\theta$, representing respectively the ground speed of the trainer and the deviation of the recorder from the instant direction of the ground course. The rotary resolver or transformer 53 differs from those hereinbefore described in that two sets of two-phase windings, mounted for relative rotation with respect to each other, are provided. One set of windings is stationary and is shown as comprising the windings 54 and 55 which are displaced 90 electrical degrees. The other set of windings, also displaced 90 electrical degrees, comprise windings 56 and 57 which are mounted for rotation with shaft 44. Slip rings and brushes for the rotatable windings are shown at 58, 59 and 60.

The voltage $e_v$ induced in the winding 56 of the transformer 53 by the excitation of windings 54 and 55 is as follows:

$$e_v = e_x \sin \theta + e_y \cos \theta \quad \text{Equation 1}$$

and the voltage $e_\theta$ induced in winding 57 is, $$e_\theta = e_x \cos \theta - e_y \sin \theta \quad \text{Equation 2}$$

Each of these voltages has potential and phase as parameters which vary with the velocity and direction of the simulated aircraft and the wind, and with the setting of transformer 53.

Equation 1 will be recognized as the expression for the resultant of the quadrature components, $e_x$ and $e_y$, and, therefore, as the resultant velocity of the combined airspeed and wind speed vectors. This voltage may accordingly be used to control the speed of propulsion of the recorder plate 41. For this purpose the voltage $e_v$ is impressed on the input of the summing amplifier 61. The output of amplifier 61 is impressed on a motor 62, Fig. 2, which is mounted on spindle 42 and drives recorder wheel 49 through reduction gearing 63. Also driven by motor 62 is the two-phase generator 64, see Fig. 2, one phase of which is energized by the aforesaid reference alternating current voltage source 4. The other phase 66 is polarized to provide a voltage $-e_v$ which is opposite in polarity to $e_v$ and varies in phase and potential with the velocity of motor 62. The voltage $-e_v$ therefore has the requirements of a voltage for an inverse feedback control and is so used to modify the output current and phase of the amplifier 61 to cause motor 62 to operate at a speed directly proportional to all values of the voltage $e_v$. The amplifier 61 contains the necessary phase shifting networks to properly phase the input and output voltages.

The recorder 41 is steered in the direction of the simulated ground course of the trainer by a two-phase motor 67 having a winding 68 energized from the alternating current source 4. The motor is operated in a direction and at a speed according to the current in its other winding 69, said current being supplied from amplifier 70 under control of the input voltage $e_\theta$. The winding 69 is so polarized with respect to winding 68 that current from amplifier 70 moves motor 67 in such direction as to rotate gears 46, 48, and 47 in a direction to turn the shaft 44 and therefore windings 56 and 57 so as to reduce the voltage $e_\theta$ to zero. By this action the shaft 44 is always held in correct orientation, and the spindles and their wheels 49, 50 and 51 are always properly oriented to follow the changing course of the airplane and the effects of a constant or varying wind velocity in any direction.

It should be noted that the voltage $e_{as} \sin \epsilon$ is proportional to the vertical component of the airspeed voltage $e_{as}$ and may be used to operate a simple A. C. voltmeter 80 calibrated in rate of climb and actuated by the vertical voltage $e_{as} \sin \epsilon$ induced in the coil 17 of the transformer 11 by the airspeed voltage $e_{as}$.

The term "voltage" is to be understood as generically meaning the electric energy in the circuit and not necessarily the potential of that energy.

While the apparatus of my invention is described as operating on a voltage basis, it is to be clearly understood that the invention may be adapted to operate under control of any parameter of an electric current, such as its potential, amperage, frequency or phase. For example, the voltage E may be modulated to a frequency which is varied in proportion to airspeed by the well known method of varying the tuning of an oscillator with potentiometer such as 3, or by varying the capacitance of a condenser, one plate of which is attached to the airspeed indicator shaft 6, or by shifting phase, as with a phase shifting transformer, such as described in Standard Handbook for Electrical Engineers, Seventh Edition 3, 213.

Although I have described the detailed arrangement of one specific embodiment of the invention, it will be apparent that the invention can be variously modified and adapted within the scope of the appended claims, and by way of example, instead of using alternating current, a direct current system may be employed wherein the control parameters are potential and amperage. When a direct current system is used, cosinusoidal potentiometers are used in the manner disclosed in my copending application S. N. 511,732, filed November 25, 1943, for "Navigation Apparatus for Aircraft and Training Devices," instead of the alternating current voltage resolvers herein described.

This application has since matured into Patent No. 2,475,314, dated July 5, 1949.

I claim:

1. The combination in a recording mechanism for an aircraft trainer having a movable charting member, of means for moving said member over a chart surface, means for steering the movement of said member, means for actuating said member in accordance with control parameters of wind drift and airspeed velocities and directions, including means for resolving separate input voltages proportional to wind velocity and airspeed each into separate components proportional to movement along reference axes $x$ and $y$, means for electrically summing the component voltages representing movement along said $x$ axis to produce a voltage $e_x$, means for electrically summing the voltages representing movement along said $y$ axis to produce a voltage $e_y$, and resolving means for composing said voltages $e_x$ and $e_y$ into velocity and direction control voltages $e_v$ and $e_\theta$ for controlling respectively the moving and steering means of said recording member, said resolving means being energized by said voltages $e_x$ and $e_y$ and adjustable in accordance with the positioning of said steering means in a direction tending to reduce the voltage $e_\theta$ to zero.

2. The combination in a recording mechanism having a movable recording member, of a motor for moving said member over a chart surface, a motor for steering said member, means for actuating said member in accordance with the combined effect of a plurality of independently variable vectors comprising means for resolving independently variable input voltages each into separate components proportional to movement along reference axes $x$ and $y$, means for electrically summing the voltages representing movement along said $x$ axis to produce a voltage $e_x$, means for electrically summing the voltages representing movement along said $y$ axis to produce a voltage $e_y$, and resolving means for composing said voltages $e_x$ and $e_y$ into velocity and direction control voltages $e_v$ and $e_\theta$ for controlling respectively the moving and steering motors of said recording member, said resolving means being energized by said voltages $e_x$ and $e_y$ and adjustable in accordance with operation of said steering motor in a direction tending to reduce the voltage $e_\theta$ to zero.

3. The combination in a recording mechanism of an aircraft trainer having a movable charting member, of means for moving and steering said member over a chart surface in accordance with control parameters of velocity and direction, comprising means for providing an input voltage varying in accordance with airspeed, means for resolving said voltage to provide a component thereof proportional to horizontal airspeed, a rotary transformer having a single-phase winding energized by said voltage component and including a two-phase winding magnetically coupled to said single-phase winding, said windings being relatively movable through an angle representing pitch so as to have induced therein voltages having potential and phase as parameters varying with the simulated direction angle of the trainer and proportional to horizontal travel with relation to reference axes $x$ and $y$, means providing an input voltage varying in accordance with wind velocity, a rotary transformer having a single-phase primary winding energized by said wind velocity input voltage and separate two-phase secondary windings inductively coupled to said single-phase winding, said primary and secondary windings being relatively adjustable through an angle representing wind direction so as to have induced therein voltages having potential and phase as parameters varying with the simulated wind velocity and proportional to horizontal travel with relation to said axes $x$ and $y$, means for electrically summing the voltages representing wind velocity and airspeed along said $x$ axis to produce a resultant voltage $e_x$, means for electrically summing the voltages representing wind velocity and airspeed along said $y$ axis to produce a resultant voltage $e_y$, and resolving means for composing said voltages $e_x$ and $e_y$ into charting control voltages for controlling respectively the velocity of movement and direction of said charting member over said chart surface.

4. The combination in a recording mechanism for an aircraft trainer having a movable charting member, of motive means for moving said member over a chart surface, means for steering the movement of said member, means for energizing said motive and steering means in accordance with control parameters of wind drift and airspeed velocities and directions, including means for resolving separate electrical quantities proportional to wind velocity and airspeed each into separate components proportional to movement along coordinate reference axes $x$ and $y$, means for electrically summing the component quantities representing movement along said $x$ axis, means for electrically summing the component quantities representing movement along said $y$ axis, and resolving means for composing the summed electrical quantities into velocity and direction control quantities, said quantities energizing the aforesaid motive and steering means respectively for simulating aircraft ground speed and for directing said steering means respectively, said resolving means being energized by said summed $x$ and $y$ quantities and adjustable in accordance with positioning of said steering means in a direction tending to reduce the direction control quantity to zero.

5. The combination in a recording mechanism having a movable recording member, of a two-phase motor for driving said member over a chart surface, a two-phase motor for steering said member, means for actuating said member in accordance with the combined effect of a plurality of independently variable vectors comprising means for resolving independently variable input voltages each into separate components proportional to movement along reference axes $x$ and $y$, means for electrically summing the voltages representing movement along said $x$ axis to produce a voltage $e_x$, means for electrically summing the voltages representing movement along said $y$ axis to produce a voltage $e_y$, and resolving means for composing said voltages $e_x$ and $e_y$ into velocity and direction control voltages for controlling respectively the driving and steering motors of said recording member, one phase of each of the aforesaid motors being energized by a constant reference voltage and the other phase by one of said control voltages.

6. The combination in a recording mechanism having a movable recording member, of a two-phase motor for driving said member over a chart surface, a two-phase motor for steering said member, means for actuating said member in accordance with the combined effect of a plurality of independently variable vectors comprising means for resolving independently variable input voltages each into separate components proportional to movement along reference axes $x$ and $y$, means for electrically summing the voltages representing movement along said $x$ axis to produce a voltage $e_x$, means for electrically summing the voltages representing movement along said $y$ axis to produce a voltage $e_y$, resolving means for composing said voltages $e_x$ and $e_y$ into velocity and direction control voltages for controlling respectively the driving and steering motors of said recording member, one phase of each of the driving and steering motors being energized by a constant reference voltage and the other phase by the aforesaid velocity and direction control voltages respectively and a generator operated by said driving motor for delivering a negative feed-back voltage to the velocity control phase of said driving motor for assuring a speed response of the motor directly proportional to the aforesaid velocity control voltage.

RICHARD CARL DEHMEL.

REFERENCES CITED

The following references are of record in the file of this patent:

UNITED STATES PATENTS

| Number | Name | Date |
|---|---|---|
| 2,179,663 | Link | Nov. 14, 1939 |
| 2,475,314 | Dehmel | July 5, 1949 |
| 2,485,301 | Lowkrantz | Oct. 18, 1949 |
| 2,486,784 | Holden | Nov. 1, 1949 |

FOREIGN PATENTS

| Number | Country | Date |
|---|---|---|
| 540,736 | Great Britain | Oct. 28, 1941 |